US012454041B2

(12) United States Patent
Heggemann et al.

(10) Patent No.: US 12,454,041 B2
(45) Date of Patent: Oct. 28, 2025

(54) MANUALLY OPERABLE PRESSING TOOL

(71) Applicant: Weidmüller Interface GmbH & Co. KG, Detmold (DE)

(72) Inventors: Christian Heggemann, Detmold (DE); Siegfried Storm, Schlangen (DE); Detlev Hetland, Detmold (DE); Jan Kaup, Detmold (DE)

(73) Assignee: Weidmüller Interface GmbH & Co. KG (DE)

( * ) Notice: Subject to any disclaimer, the term of this patent is extended or adjusted under 35 U.S.C. 154(b) by 329 days.

(21) Appl. No.: 18/159,835

(22) Filed: Jan. 26, 2023

(65) Prior Publication Data

US 2023/0234197 A1 Jul. 27, 2023

(30) Foreign Application Priority Data

Jan. 27, 2022 (DE) ......................... 102022101938.1

(51) Int. Cl.
*H01R 43/042* (2006.01)
*B25B 7/12* (2006.01)
(Continued)

(52) U.S. Cl.
CPC .............. *B25B 27/146* (2013.01); *B25B 7/12* (2013.01); *H01R 43/042* (2013.01); *B25B 7/14* (2013.01); *Y10T 29/53226* (2015.01)

(58) Field of Classification Search
CPC ....... H01R 43/042; B25B 27/146; B25B 7/12; B25B 7/14; Y10T 29/53226; B21C 25/02
(Continued)

(56) References Cited

U.S. PATENT DOCUMENTS 3,523,351 A * 8/1970 Filia ..................... H01R 43/042 72/409.14
5,012,666 A * 5/1991 Chen .................... H01R 43/042 81/382
(Continued)

FOREIGN PATENT DOCUMENTS

CN 201394812 Y * 2/2010
DE 1204600 A 11/1965
(Continued)

OTHER PUBLICATIONS

Weidmüller Interface GmbH & Co. KG Crimping tools for wire end ferrules, with and without plastic collars (PZ 2.5 S) (Year: 2024).*
(Continued)

*Primary Examiner* — Mahdi H Nejad
(74) *Attorney, Agent, or Firm* — LAUBSCHER & FRETWELL, P.C.

(57) ABSTRACT

A manually operated pressing tool has a first manual lever, a second manual lever, a node element pivotably connecting the two manual levers to one another via a first pivot axis and a second pivot axis and a crimping unit arranged on a head portion of the pressing tool. The crimping unit includes a crimping die and a die receptacle. The first and second manual levers are further coupled to one another via a fork element which has a fork neck, a first fork finger and a second fork finger. The fork neck is pivotably coupled to the first manual lever via a third pivot axis. The crimping die is arranged on the first fork finger and the die receptacle is arranged on a head portion of the first manual lever, The second fork finger is pivotably coupled to the second manual lever via a fourth pivot axis.

9 Claims, 3 Drawing Sheets

(51) Int. Cl.
*B25B 27/14* (2006.01)
*H01R 43/04* (2006.01)
*B25B 7/14* (2006.01)

(58) Field of Classification Search
USPC ................................................ 81/300; 29/751
See application file for complete search history.

(56) References Cited

U.S. PATENT DOCUMENTS

| | | | | |
|---|---|---|---|---|
| 5,138,864 | A * | 8/1992 | Tarpill | H01R 43/042 29/751 |
| 6,612,206 | B1 * | 9/2003 | Heggemann | B25B 7/14 81/392 |
| 7,814,646 | B2 * | 10/2010 | Tarpill | H01R 43/0425 29/748 |
| 9,583,904 | B2 * | 2/2017 | Battenfeld | B21J 7/16 |
| 11,462,874 | B2 * | 10/2022 | Weisheit | B25B 27/146 |
| 11,465,265 | B2 * | 10/2022 | Ullbors | B25B 7/14 |
| 2020/0223041 | A1 * | 7/2020 | Ullbors | B25B 7/12 |
| 2021/0336399 | A1 * | 10/2021 | Glockseisen | B25B 27/146 |

FOREIGN PATENT DOCUMENTS

| | | | | |
|---|---|---|---|---|
| DE | 7205611 | U | 5/1972 | |
| DE | 3708727 | A1 | 11/1987 | |
| DE | 19728685 | A1 | 1/1999 | |
| DE | 29914764 | U1 * | 1/2001 | B25B 27/146 |
| DE | 102019123904 | A1 | 3/2021 | |
| EP | 1080845 | B1 | 10/2003 | |
| EP | 3553900 | * | 10/2019 | |

OTHER PUBLICATIONS

PZ 2.5 S Crimping Tool found at: https://www.facebook.com/100028126856479/videos/1050045653491252/?_so_=permalink (Year: 2024).*

Weidmuller PZ 2.5 Crimping Tool Specs (Year: 2024).*

* cited by examiner

MANUALLY OPERABLE PRESSING TOOL

This application claims priority of DE 10 2022 101 938.1 filed Jan. 27, 2022. The entire content of this application is incorporated herein by reference.

BACKGROUND OF THE INVENTION

The present invention relates to a manually operable pressing tool.

A generic manually operable pressing tool is known from EP 1080845 B1. In this pressing tool, a lever head of a first manual lever forms an upper pressing jaw. A lower pressing jaw can be moved with the aid of a second manual lever to open and close a pliers mouth formed from the two pressing jaws. A crimping die is attached to the pressing jaw. A crimping stamp is attached to the lower pressing jaw which produces a closing movement of the pliers mouth when the pressing jaw of the second manual lever is moved in the direction of the first manual lever to produce a closing movement of the pliers mouth. The die receptacle then presses with the lower pressing jaw against the crimping die on the upper pressing jaw. Such a pressing tool, per se, has stood the test of time.

The present invention was developed to provide a pressing tool which is constructed more simply while simultaneously guaranteeing reliable pressing.

SUMMARY OF THE INVENTION

The manually operable pressing tool according to the invention has a first manual lever and a second manual lever. The pressing tool further includes a node element which pivotably connects a first pivot axis and a second pivot axis to one another via the manual lever, as well as a crimping unit which has a crimping die and a die receptacle and which is disposed in a tool head of the pressing tool.

The two manual levers are coupled to one another via a fork element which has a fork neck, a first fork finger and a second fork finger. The fork neck is pivotably coupled to the first manual lever via a third pivot axis. The crimping die is disposed on the first fork finger. The second fork finger is pivotably coupled to the second manual lever via a fourth pivot a is and the die receptacle is disposed on a lever head of the first manual lever.

With a manually operable pressing tool configured in such a way, very simple and reliable pressing is enabled. As distinguished from the pressing or crimping tool known from the prior art, when the pressing tool of the subject invention is pressed closed, the crimping die lowers into the die receptacle in contrast to the otherwise conventional upward pivotal movement of the lower pressing jaw against the upper pressing jaw.

According to a preferred embodiment, the pivot axes are positioned such that when the pressing tool is closed by pivoting the second manual lever toward the first manual lever, the crimping die can be lowered into the die receptacle.

According to another embodiment, a force storage element that pushes the second manual lever into an open position is fixed between the head area of the first manual lever and the node element close to the second pivot axis. With the force storage element, the pressing tool is always held in the open position and thus enables automatic spreading of the manual lever. The force storage element abuts an outer wall of the die receptacle and preferably is configured as a pressure spring.

The die receptacle has a receiving groove which is open towards the crimping die for receiving a wire end over which a wire end ferrule is placed. An insertion aid, such as a bevel, is formed on a region adjoining the receiving groove. With such an insertion aid on the die receptacle, targeted insertion of the wire end over which the wire end ferrule is placed is facilitated.

According to another embodiment, a retaining pawl is resiliently and pivotably mounted on the second manual lever. The retaining pawl is selectively positioned in a predetermined angular position of the second manual lever to engage a tooth formed on the node element and prevent the second manual lever from pivoting back into the open position during operation of the pressing tool.

Such a retaining pawl ensures that closing of the pressing tool during a crimping process is not prematurely discontinued before the crimping die is lowered sufficiently far into the die receptacle.

The teeth formed on the node element furthermore saves on the installation of an additional counter-element for the retaining pawl.

In order to be able to process different diameters on wire end ferrules, the fourth pivot axis is guided in an elongated hole formed in the head area of the second manual lever and is adjustable along the elongated hole with an eccentric rotatably affixed to the second manual lever. This makes it possible to simply set the lowering depth of the crimping die into the die receptacle.

According to a further embodiment, the crimping die has a base which is pivotably mounted on the first fork finger and from which there extends a crimping stamp and a die guide which has two limbs, wherein the die guide can be placed over the die receptacle.

The die receptacle is preferably pivotably mounted on the lever head of the first manual lever. This enables a simple self-orientation of the die receptacle and of the crimping die which are always guided on one another via the die guide.

BRIEF DESCRIPTION OF THE FIGURES

Preferred embodiments of the invention will be explained in greater detail below with reference to the accompanying drawings, in which.

DETAILED DESCRIPTION

In the following description of the figures, terms such as top, bottom, left, right, front, rear, etc. relate exclusively to the exemplary depiction and position of the pressing tool, manual lever, node element, crimping unit, fork element and the like, selected in the respective figures. These terms should not be understood to be restrictive, i.e. these references may change through different working positions or the symmetrically identical design or the like.

Figure 1:
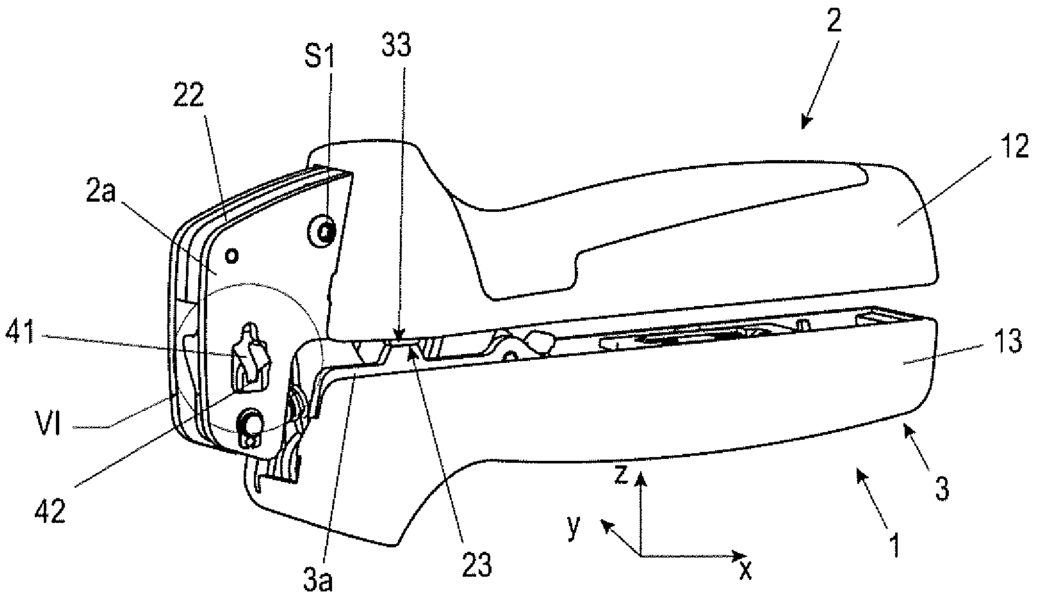
FIG. 1 is a perspective view of a pressing tool according to the invention with grip shells which are placed over the gripping regions of the manual lever.

In FIG. 1, a manually operable pressing tool according to the invention is labelled overall with the reference number 1.

The pressing tool 1 includes a first manual lever 2, a second manual lever 3 and a node element 6 which pivotably connects the two manual levers 2, 3 to one another via a first pivot axis S1 and a second pivot axis S2.

The two manual levers 2, 3 each have a grip region 21, 31 and a lever head 22, 32. Furthermore, both the first manual lever 2 and the second manual lever 3 includes two plates 2, 2*a*, 3, 3*a* which are situated parallel to one another and which are kept spaced apart relative to one another via a number of spacers, not shown.

Figure 3:
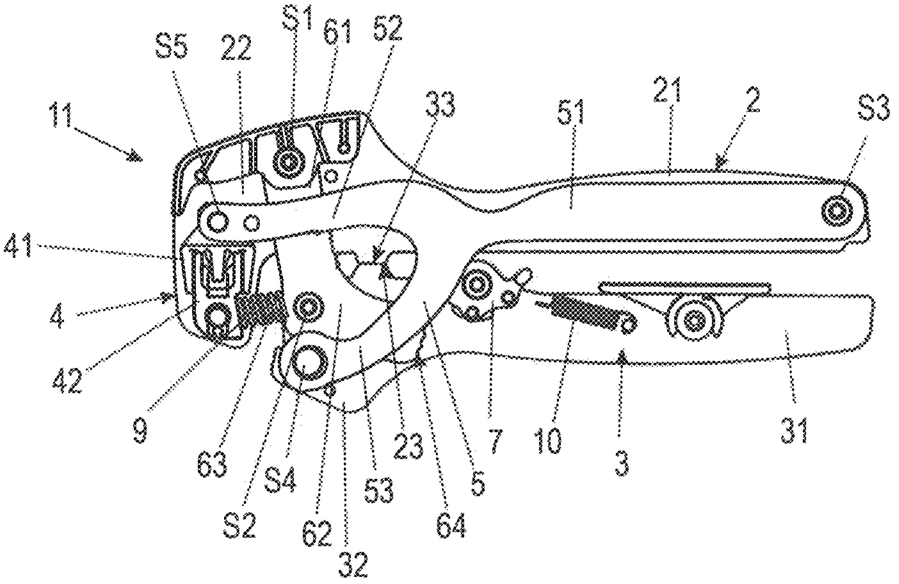
FIG. 3 is a front view of the gripping tool shown FIG. 1 in the closed position with the grip shells the front side plate of the manual levers removed with the levers held spaced apart from one another via spacers from two side plates which are situated parallel to one another.
Figure 4:
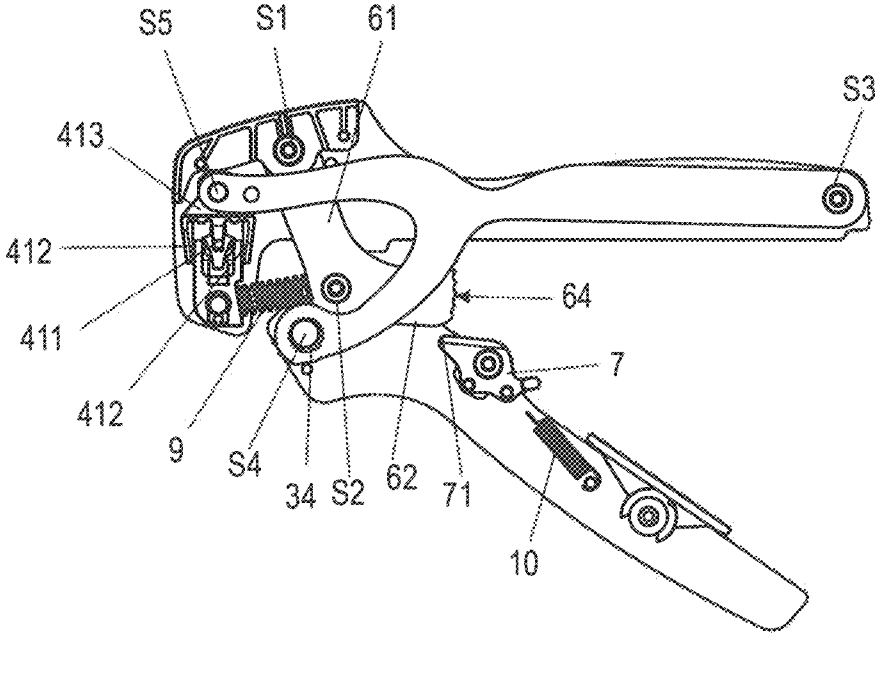
FIG. 4 is a front view of the pressing tool of FIG. 3 in the open position.

As shown in FIGS. 3 and 4, in which respective grip shells 12, 13 and the front side plate 2*a*, 3*a* have been removed, a crimping unit 4 is disposed in the region of a tool head 11. The crimping unit 4 has a crimping die 41 and a die receptacle 42.

As further shown in FIGS. 3 and 4, the two manual levers 2, 3 are additionally coupled to one another via a fork element 5. Here, the fork element 5, which includes a fork neck 51, a first fork finger 52 and a second fork finger 53, is pivotably coupled, via a third pivot axis S3, to the first manual lever 2 at that end of the fork neck 51 which is remote from the tool head 11. The pivot axis S3 can be mounted on only one of the side plates 2, 2*a* or on both side plates 2*a*, 2.

It can further be seen in FIGS. 3 and 4 that the crimping die 41 is disposed at the first fork finger 52 which further extends approximately in the longitudinal direction of the fork neck 51. The second fork finger 53 is pivotably coupled to the second manual lever 3 via a fourth pivot axis S4.

The design and the arrangement of these four pivot axes S1, S2, S3 and S4 makes it possible for the crimping die 41 to be lowered into the die receptacle 42 when the pressing tool 1 is closed from the position shown in FIG. 4 into the position shown in FIG. 3 through pivoting the second manual lever 3 toward the first manual lever 2.

The die receptacle 42 is disposed on a lever head 22 of the first manual lever 2. In the preferred embodiment, the die receptacle 42 is accommodated in a section of the lever head 22 of the first manual lever 2, which section extends at an angle, in particular at an obtuse angle or right angle in the direction of the second manual lever 3. In order to keep the first manual lever 2 in a spread, i.e. open, position relative to the second manual lever 3 without the external exertion of force, the pressing tool 1 includes a force storage element 9 which pushes the second manual lever 3 into an open position. The force storage element is fixed between the head area 22 of the first manual lever 2 and the node element 6 close to the second pivot axis S2. The force storage element 9 is preferably configured as a pressure spring.

As can be seen in FIGS. 3 and 4, the pressure spring 9 is supported on one side on an outer wall of the die receptacle 42 and on the other side on the node element 6 close to the second pivot axis S2.

Figure 6:
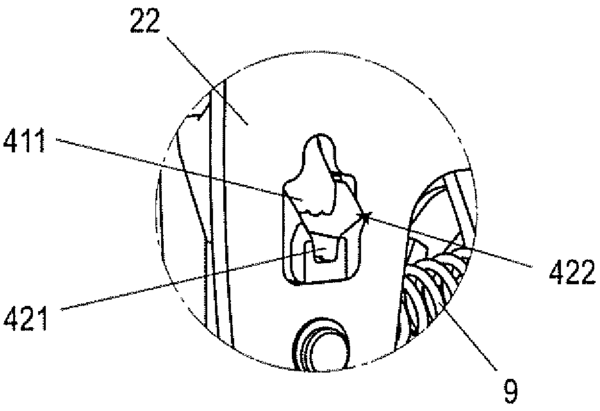
FIG. 6 is a detailed view of the head of the pressing tool die receptacle taken along line VI in FIG. 1, to depict a detail of the die receptacle.

Referring to FIGS. 3, 4 and 6, the die receptacle 42 of the crimping unit 4 has a receiving groove 421, which is open towards the crimping die 41, for receiving a wire end over which a wire end ferrule is placed.

An insertion aid is formed on a region adjoining the receiving groove 421 to facilitate and guide insertion of the wire end over which the wire end ferrule is placed. The insertion aid is concealed in the embodiment shown as a bevel 422.

The die receptacle 42 is preferably pivotably mounted on the lever head 22 of the first manual lever 2. Likewise, the crimping die 41 is preferably pivotably mounted on the first fork finger 52.

The crimping die 41, as shown in FIGS. 3 and 4, has a base 413 which is pivotably mounted on the first fork finger 52 via a fifth pivot axis S5 from which there extends a crimping stamp 411 and a die guide 412 which has two limbs. The two limbs of the die guide 412, together with the base 413, form a U-shaped receptacle, into which the crimping stamp 411 extends in a centered manner.

The outer walls of the die receptacle 42 are appropriately formed such that the inner sides of the limbs of the die guide 412 can be slidingly guided on the outer sides of the die receptacle 42 so that the die guide 412 can be placed over the die receptacle 42.

A fixed connection between the die receptacle 42 and the lever head is also conceivable. In such a construction, the orientation of the crimping stamp 411 and the crimping die 41 relative to each other is predetermined by the position in the pressing tool 1.

Figure 5:
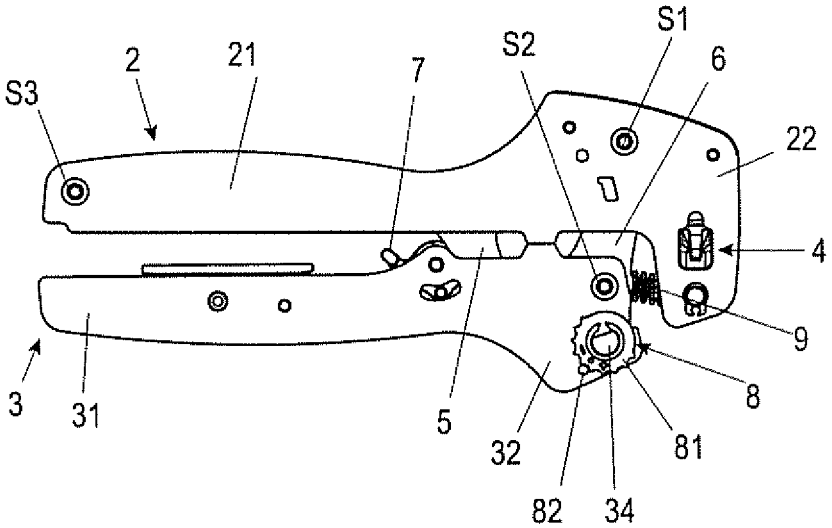
FIG. 5 is a rear view of the pressing tool shown in FIG. 3 with an eccentric.

In order to compensate for manufacturing tolerances, the fourth pivot axis S4, as shown in FIGS. 4 and 5, is guided in an elongated hole 33 formed in the head area 32 of the second manual lever 3 and is adjustable along the elongated hole 33 with an eccentric 8 rotatably affixed to the second manual lever 3. It is possible to set the extent of closing of the die, which includes the crimping die 41 and the die receptacle 42, by adjusting the eccentric 8. The eccentric 8 preferably has an eccentric ring 81.

A detent element 82 fixed to the manual lever 3, the detent element being in the form of a pin for example which enables a simple catching of the eccentric ring 81 in a predetermined position to vary the insertion depth of the crimping stamp 411 into the receiving groove 421 of the die receptacle 42. Two or more notches, into which the detent element 82 can catch, can be provided circumferentially on the eccentric ring 81.

Figure 2:
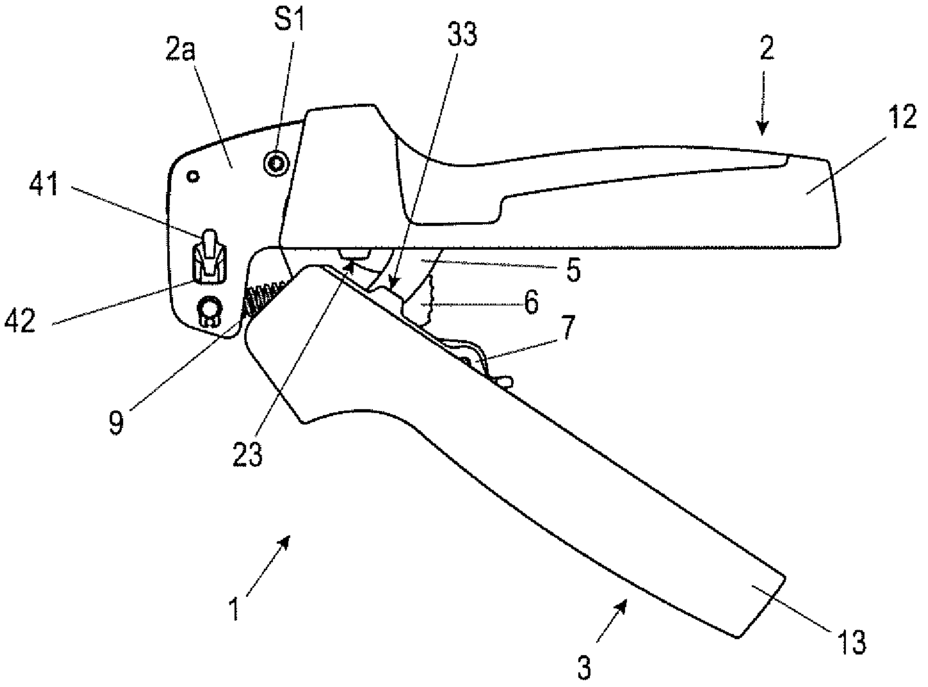
FIG. 2 is a front view of the pressing tool shown in FIG. 1 in an open position.

In order to enable a complete closure of the pressing tool 1 for a crimping process, in which stops 23, 33 formed on the first manual lever 2 and the second manual lever 3 touch one another, a retaining pawl 7, which is shown in FIGS. 2-4, is resiliently and pivotably mounted on the second manual lever 3 via a spring element 10, preferably in the form of a tension spring.

This retaining pawl 7 prevents premature spreading of the pressing tool 1 into its final open position, as is shown in FIG. 4 or 2. For this purpose, when the pressing tool 1 is closed, a catch 71 of the retaining pawl 7 engages teeth 64 formed on the node element 6.

The node element 6 is configured in an L-shape with a first limb 61 extending between the pivot axes S1 and S2 and a second limb 62 extending between the second pivot axis S2 and the teeth 64 at an obtuse angle thereto.

The length of this second limb 62 is dimensioned such that the catch 71 of the retaining pawl 7 can slide along the teeth when the pressing tool 1 is pushed in the closing direction but prevents the second manual lever 3 from spreading open again relative to the first manual lever 2 during engagement with the teeth.

Only when the closed position, in which the stops 23, 33 of the two manual levers 2, 3 touch one another, is reached does the catch 71 of the retaining pawl 7 come out of engagement with the teeth 64 of the node element 6 and can then slide along the teeth 64 in the opening direction through pivotal movement in the opposite direction during the pivotal movement of the second manual lever 3.

What is claimed is:

1. A manually operated pressing tool, comprising
- a first manual lever;
- a second manual lever;
- a node element pivotably connecting said first and second manual levers via a first pivot axis and a second pivot axis;
- a fork element connected between said first and second manual levers, said fork element including a fork neck pivotably coupled to said first manual lever via a third pivot axis, a first fork finger and a second fork finger;
- a crimping unit arranged in a head portion of the tool and including a crimping die arranged on said first fork finger and a die receptacle arranged on a head portion of said first manual lever, said second fork finger being pivotably coupled to said second manual lever via a fourth pivot axis; and
- an energy storage device arranged between said head portion of said first manual lever and said node element that urges said second manual lever into an open position.

2. The pressing tool as defined in claim 1, wherein said first, second, third and fourth pivot axes are positioned to lower said crimping die into said die receptacle when the pressing tool is closed by pivoting said second manual lever toward said first manual lever.

3. The pressing tool as defined in claim 1, wherein said energy storage device abuts an outer wall of said die receptacle.

4. The pressing tool as defined in claim 1, wherein said energy storage device comprises a pressure spring.

5. The pressing tool as defined in claim 1, wherein said die receptacle contains a receiving groove which is open towards said crimping die for receiving a wire end over which a wire end ferrule is placed, and further wherein a bevel is formed on a region adjoining said receiving groove to guide a wire end into said receiving groove.

6. The pressing tool as defined in claim 1, and further comprising a retaining pawl resiliently and pivotably mounted on said second manual lever, said retaining pawl being selectively positioned to engage a tooth on said node element and prevent said second manual lever from pivoting back into an open position during operation of the pressing tool.

7. The pressing tool as defined in claim 1, wherein said crimping die includes a base which is pivotably mounted on said first fork finger and from which extends a crimping stamp and a die guide having two limbs, wherein said die guide can be placed over said die receptacle.

8. A manually operated pressing tool, comprising
- a first manual lever;
- a second manual lever;
- a node element pivotably connecting said first and second manual levers via a first pivot axis and a second pivot axis;
- a fork element connected between said first and second manual levers, said fork element including a fork neck pivotably coupled to said first manual lever via a third pivot axis, a first fork finger and a second fork finger; and
- a crimping unit arranged in a head portion of the tool and including a crimping die arranged on said first fork finger and a die receptacle arranged on a head portion of said first manual lever. said second fork finger being pivotably coupled to said second manual lever via a fourth pivot axis, wherein said fourth pivot axis is guided in an elongated hole formed in said head area of said second manual lever and is adjustable along the elongated hole with an eccentric element rotatably connected with said second manual lever.

9. A manually operated pressing tool, comprising
- a first manual lever;
- a second manual lever;
- a node element pivotably connecting said first and second manual levers via a first pivot axis and a second pivot axis;
- a fork element connected between said first and second manual levers, said fork element including a fork neck pivotably coupled to said first manual lever via a third pivot axis, a first fork finger and a second fork finger; and
- a crimping unit arranged in a head portion of the toot and including a crimping die arranged on said first fork finger and a die receptacle arranged on a head portion of said first manual lever. said second fork finger being pivotably coupled to said second manual lever via a fourth pivot axis, wherein said die receptacle is pivotably mounted on said head portion of said first manual lever.

* * * * *